United States Patent
Ezaz-Nikpay et al.

(10) Patent No.: US 10,849,455 B2
(45) Date of Patent: Dec. 1, 2020

(54) BEVERAGE DISPENSING MACHINE

(71) Applicant: Zendegii Ltd., London (GB)

(72) Inventors: Khosro Ezaz-Nikpay, London (GB); Daniel Kohn, London (GB); Hendrik Sabert, London (GB); Hiromi Sasaki, London (GB); Aurelie Schmitt, London (GB)

(73) Assignee: Zendegii Ltd, London (GB)

( * ) Notice: Subject to any disclaimer, the term of this patent is extended or adjusted under 35 U.S.C. 154(b) by 406 days.

(21) Appl. No.: 14/433,904

(22) PCT Filed: Oct. 11, 2013

(86) PCT No.: PCT/GB2013/052651
§ 371 (c)(1),
(2) Date: Apr. 7, 2015

(87) PCT Pub. No.: WO2014/060724
PCT Pub. Date: Apr. 24, 2014

(65) Prior Publication Data
US 2015/0289708 A1    Oct. 15, 2015

(30) Foreign Application Priority Data
Oct. 15, 2012  (GB) .................................. 1218476.8

(51) Int. Cl.
*A47J 31/44*    (2006.01)
*A47J 31/40*    (2006.01)
(Continued)

(52) U.S. Cl.
CPC ............. *A47J 31/4403* (2013.01); *A23L 2/02* (2013.01); *A23L 2/39* (2013.01); *A47J 31/407* (2013.01);
(Continued)

(58) Field of Classification Search
CPC ...... A47J 31/4403; A47J 31/407; A47J 31/00; A47J 31/40; A23L 2/02; A23L 2/39;
(Continued)

(56) References Cited

U.S. PATENT DOCUMENTS 3,542,345 A * 11/1970 Kuris ...................... B01F 11/02
366/113
4,550,653 A * 11/1985 Hedenberg ............... A21B 1/22
426/233

(Continued)

FOREIGN PATENT DOCUMENTS

EP    2 430 955    3/2012
GB    2 121 762    1/1984
(Continued)

OTHER PUBLICATIONS

"3 Ways to make and enjoy iced coffee drinks at home." Coffee Detective. Jul. 15, 2011. <http://www.coffeedetective.com/iced-coffee-drinks-at-home.html>. Accessed Mar. 31, 2017.*
(Continued)

*Primary Examiner* — Ericson M Lachica
(74) *Attorney, Agent, or Firm* — Burns & Levinson LLP; Shawn P. Foley

(57) ABSTRACT

A beverage dispensing machine (2) has a housing that provides a receptacle for receiving an expandable cartridge (12) that is coupled into the machine so that it can receive a charge of water. A kneading system (40) is provided to act on the cartridge within the receptacle. The kneading system is activated after water has been allowed to enter the cartridge and mechanically acts on or from the exterior of the cartridge in order to compress and release regions of the cartridge in order to create vigorous agitation to move the contents of the cartridge around inside the main compartment and bring them into close contact with a charge of water from the supply. Such a machine allows a wide variety (Continued)

of beverages to be created conveniently on demand from freeze-dried ingredients that can be stored inside the cartridges with a long shelf life.

9 Claims, 8 Drawing Sheets

(51) Int. Cl.
    *B65D 85/80*     (2006.01)
    *A23L 2/02*     (2006.01)
    *A23L 2/39*     (2006.01)
    *B65D 77/06*     (2006.01)
    *B65D 85/804*     (2006.01)

(52) U.S. Cl.
    CPC ......... *B65D 77/06* (2013.01); *B65D 85/8043* (2013.01); *A23V 2002/00* (2013.01)

(58) Field of Classification Search
    CPC ................ B65D 85/8043; B65D 77/06; B65D 85/8046; B65D 85/804; B01F 11/0065; B01F 11/02; B01F 11/0266; B01F 11/0275; A23B 7/0433; A23B 7/0425
    USPC .......................................... 426/115, 433, 112
    See application file for complete search history.

(56) References Cited

U.S. PATENT DOCUMENTS

| | | | | |
|---|---|---|---|---|
| 6,267,498 | B1 * | 7/2001 | Lafond | B01F 11/0065 366/197 |
| 6,390,169 | B1 * | 5/2002 | Johnson | B29C 70/384 156/523 |
| 6,439,759 | B1 * | 8/2002 | Ray | B01F 11/0065 366/197 |
| 6,805,041 | B2 * | 10/2004 | Colston | A47J 31/3628 426/112 |
| 7,097,074 | B2 | 8/2006 | Halliday et al. | |
| 2004/0025701 | A1 | 2/2004 | Colston et al. | |
| 2005/0078552 | A1 * | 4/2005 | Zambaux | B01F 7/1695 366/241 |
| 2008/0142085 | A1 | 6/2008 | Burkard | |
| 2009/0311384 | A1 * | 12/2009 | MacMahon | A23C 11/08 426/78 |
| 2011/0076361 | A1 * | 3/2011 | Peterson | B65D 85/8043 426/79 |
| 2012/0100259 | A1 * | 4/2012 | Rapparini | A47J 31/3695 426/77 |

FOREIGN PATENT DOCUMENTS

| | | |
|---|---|---|
| GB | 2 426 234 | 11/2006 |
| KR | 20070073557 | 7/2007 |
| WO | 99/05044 | 2/1999 |
| WO | 2006/123131 | 11/2006 |
| WO | 2012/175985 | 12/2012 |

OTHER PUBLICATIONS

"How to Make Iced Coffee at Home." Food and Family. Jun. 15, 2009. <http://www.fortysomething.ca/2009/06/how_to_make_iced_coffee_at_home>. Accessed Mar. 31, 2017.*

* cited by examiner

BEVERAGE DISPENSING MACHINE

CROSS-REFERENCE TO RELATED APPLICATIONS

This application is a U.S. national stage application under 35 U.S.C. § 371 of co-pending International Application No. PCT/GB2013/052651, filed on Oct. 13, 2013, and entitled, "BEVERAGE DISPENSING MACHINE," which in turn claims the benefit of and priority to Great Britain Patent Application No. 1218476.8, filed on Oct. 15, 2012, both of which are incorporated by reference herein in their entirety for all purposes.

TECHNICAL FIELD

The present invention relates to a method and machine suitable for domestic use for dispensing beverages and certain foods and, more specifically, to a dispenser, which rapidly prepares a drinkable product from the contents of a cartridge that is inserted into the machine, containing solid difficult-to-dissolve ingredients and, more specifically, freeze-dried fruit or vegetable ingredients and/or freeze-dried fruit or vegetable juices. This is a novel technical field not previously addressed in the art of domestic beverage dispensing machines.

BACKGROUND ART

It is known how to make cold beverages such as juices and fruit smoothies from fresh ingredients by using a juicer or blender. However, such machines require a substantial amount of cleaning after each use since the product comes into contact with components of the machine. Moreover fresh ingredients have a very limited shelf life.

Numerous machines are known for brewing coffee and tea by passing hot water through a cartridge containing coffee grounds or other substances from which a beverage can be brewed. These are easier to maintain, but are limited in the ingredients that can be used. The TASSIMO (Registered Trade Mark) machine is described in a multitude of patent documents including, for example, PTL 0001: U.S. Pat. No. 7,097,074 B (KRAFT FOODS R & D INC). 2006 Apr. 29.

This system uses an essentially rigid cartridge, which has a foil seal that can be pierced in order to create an inlet that allows water to pass along a convoluted path through the beverage ingredients contained within the cartridge. The beverage can then be directly discharged into a receptacle.

An example of a multi-drink beverage vending machine is manufactured by BEVYZ (Trade Mark). This machine uses capsules in the form of rigid cartridges sealed with foil lids that contain liquid ingredients like juice concentrates or flavor mixtures. The dispensing machine described, for example, in PTL 0002: EP 2430955 A (MDS GLOBAL HOLDING LTD). 2012 Mar. 21.

is designed to compress a base of the capsule in order to eject the contents into a container at the same time as a charge of water.

Machines are also known for preparing beverages using flexible cartridges. One such system which has been on the market since 1984 is supplied under the FLAVIA (Registered Trade Mark) brand, and uses a flexible cartridge containing beverage ingredients such as tea or coffee and a paper filter. The cartridge has a plastic nozzle, which allows it to be clipped into a machine that passes water through the cartridge and dispenses a drink directly from an outlet of the cartridge.

Another coffee brewing machine is described in

PTL 0003: US 2004025701 A (COLSTON). 2004 Feb. 12.

as an adaptation of the above type of machine. It holds the cartridge in a clamp. The clamp is a cavity with movable walls. In the FIG. 4 embodiment, it is proposed to oscillate a movable region of a clamp holding a sachet containing coffee grounds under pressure in order to agitate the ingredients or to pump liquid through the sachet. The focus of this disclosure is on brewing coffee or tea. This approach is not suitable for the preparation of beverages from freeze-dried fruit or vegetable ingredients. The type of 'agitation' envisaged is suggestive of something more calm and controlled than envisaged by the present invention.

DISCLOSURE OF INVENTION

It would be useful to provide a machine that could reconstitute solid freeze-dried ingredients rapidly and conveniently on demand. Freeze-drying uniquely preserves the flavours and vitamin content of fresh ingredients. After rehydration, a freeze-dried orange juice can have more than 200% greater vitamin C content than a typical retail juice for example. Freeze-drying reduces the volume and weight of a juice or smoothie beverage by 5 to 9 times, facilitating storage and transport for the consumer and across the supply chain. If the freeze-dried ingredients are vacuum packed they can be stored at ambient temperature for several years. The use of mixtures of freeze-dried ingredients of different flavours offers the potential for a wide variety of product offerings.

None of the systems described above would be suitable however for the preparation of beverages from freeze-dried fruit or vegetable ingredients. While freeze-dried coffee liquor, for example, can be successfully dissolved in boiling water, rehydration of freeze-dried fruit or vegetable ingredients is not as straightforward, especially if a cold beverage is required. The mere addition of water to these ingredients tends to create insoluble cement that resists further complete rehydration and homogenization, clogs filters and is difficult to dispense out of a cartridge.

Technical Problem

The present invention aims to overcome the problems of rehydrating and/or bringing back the dry product into solution, preferably using chilled water within a timescale suitable for on-demand use at home of, say, 30 to 60 seconds, and in such a way that the product is fully contained within the cartridge and does not come into contact with the dispensing machine.

Technical Solution

The invention recognises that these problems can be best overcome by employing a method, which acts on or from the exterior of a cartridge in order to vigorously agitate the contents and thereby dissolve the majority of the contents by mechanical action. The purpose of the vigorous agitation is to rehydrate and homogenise freeze-dried ingredients quickly and efficiently.

The present invention accordingly provides a method of producing a beverage from dry ingredients contained within a sealed flexible cartridge, comprising breaking the seal to introduce a charge of water and characterised in that the ingredients comprise freeze-dried fruit or vegetable ingredients and/or freeze-dried fruit or vegetable juice, and in that the method comprises the use of a mechanism acting on or from an exterior of the cartridge to vigorously agitate the water with the ingredients inside the cartridge to produce the beverage under low hydrostatic pressure.

The water charge is preferably at least of equal volume to the ingredients, and the cartridge expandable so that the ingredients and water are able to move freely and loosely, and intermingle chaotically and randomly, moving up and down in an irregular manner within the cartridge under the effects of the manipulation. Several charges of water may pass sequentially through the cartridge to provide the desired beverage. The ingredients in the interior of the cartridge are under low hydrostatic pressure, typically less than 1 to 10 KiloPascal of overpressure. This contrasts markedly with the machines that produce espresso coffee where the ingredients are under substantially more than atmospheric pressure, for example 9 bar. COLSTON, for example, suggests normal tea brewing at 1 bar and espresso at 5 to 15 bar and one of the main objectives of that invention is to provide support for a flexible cartridge to withstand these pressures.

The present invention also provides a machine and cartridge designs as specified in the appended claims to facilitate the method of the invention.

Advantageous Effects

The vigorous agitation under low hydrostatic pressure of these difficult to dissolve or reconstitute ingredients with water overcomes the problems of cement creation. The cartridge design can also contribute to the vigorous agitation by the use of a roller moving over its ridged, corrugated, pimpled or dimpled surface that can be compressed during manipulation and will pop or snap back into shape on release, throwing off any ingredient lumps or aggregations back into the water to add to the agitation and chaotic mixing movement within the cartridge.

The reader is intended to understand that low hydrostatic pressure within the cartridge means the overpressure that can arise in the cartridge as a result of operation of the machine. This overpressure is less than one atmosphere of overpressure and possibly substantially lower hydrostatic pressures. This eliminates the risk of bursting the cartridge and as well as preventing unnecessary consolidation of the ingredients.

BRIEF DESCRIPTION OF DRAWINGS

In order that the invention may be well understood some embodiments thereof will now be described, by way of example only, with reference to the accompanying diagrammatic drawings, in which.

MODE(S) FOR CARRYING OUT THE INVENTION

Figure 1:
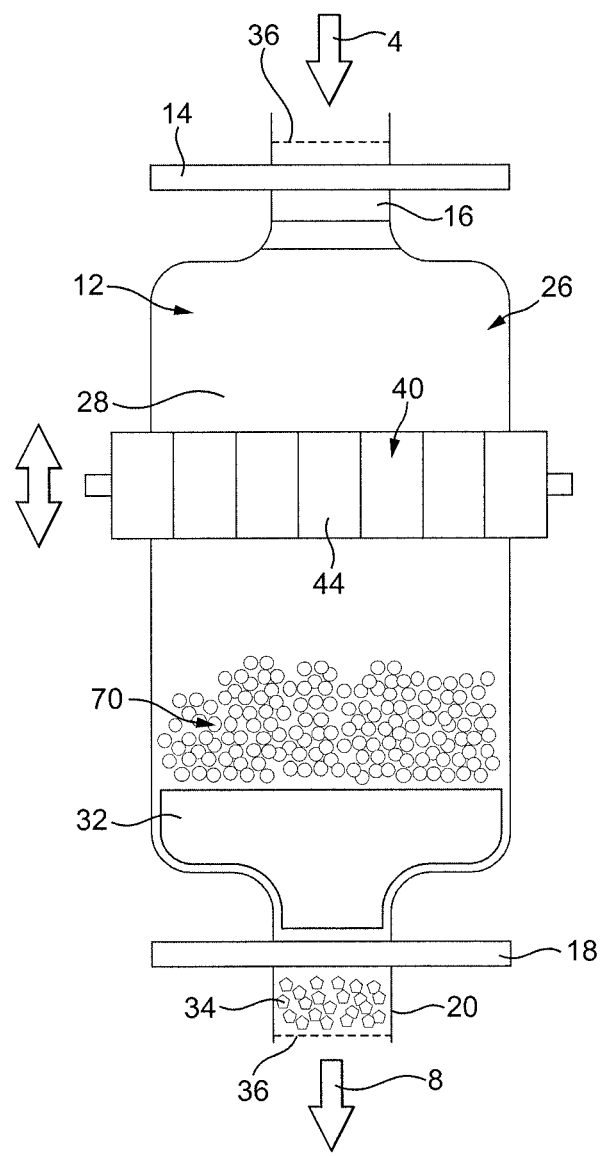
FIG. 1 is a front plan view of a first embodiment of the invention using linear roller motion to agitate the ingredients in a cartridge.

A first embodiment of a household machine for dispensing beverages will now be described by reference to FIGS. 1 and 2. The term beverage is used for the product of the machine. The term the intended to cover any product created, whether it is a traditional drink such as a smoothie, or other liquid product that can be made from the freeze-dried ingredients such as soup, sauce, baby food and the like.

The beverage dispenser machine has a housing with a water supply connection 4. Ideally the machine is connected to a permanent water source, but it may also contain a water reservoir to be filled up by the user when required as with a typical household coffee filtering machine. The housing defines a receptacle for receiving a flexible cartridge or pouch 12. A control panel is provided on the housing with switches to start and stop a beverage preparation cycle. The panel may also allow the user to select different programmes. A door or cover over the cartridge receptacle may be provided. It will be appreciated that a suitable closure such as a hinged or roll-up door could be used to cover the receptacle in use and allow access for loading and unloading cartridges. Since beverage dispensing machines are commonplace domestic articles, the basic details will not be described as the skilled reader will readily appreciate that known features such as microprocessor control can readily be adapted for use with the kneading system required by the present invention As shown in FIG. 1 the water supply for the machine is connected to a first coupling 14 for connecting an inlet section 16 of the cartridge to a water source. There is a second outlet coupling 18 for connecting an outlet section 20 of the cartridge to a machine outlet (preferably the cartridge outlet itself to avoid the need for additional machine components that require cleaning) that dispenses a beverage product into a container.

A kneading system is provided to act on the cartridge within the receptacle. The kneading system is activated after a charge of water has been allowed to enter the cartridge and mechanically acts on the exterior of the pouch to move the contents of the pouch around, facilitating rehydration and/or the dissolution of the contained product in the water. The outlet coupling is provided to seal or release the outlet section of the cartridge in order to prevent dispensing of the product during the operation of the kneading system. After a predetermined time an outlet valve can be opened to dispense the beverage from the cartridge outlet 20 into the container. Typically several charges of water will be passed through a single cartridge to produce the complete product.

The machine can use various different kneading systems and the embodiments show some examples of different approaches.

The Cartridge

The cartridge 12 is designed to hold sufficient freeze-dried fruit or vegetable ingredients and/or freeze-dried fruit or vegetable juice to make a single serving of a beverage.

The cartridge is an expandable soft pouch and has a flexible envelope 26 of material such as a food-safe plastic material that can be heat-sealed. A suitable material is polyethylene (PE) lined polyamide (nylon).

The cartridge has inlet, main compartment 28 and outlet sections. The main compartment has major surfaces on each side face, which are preferably joined together by gusseted panels along their longitudinal edges so that the compartment can expand when filled with a charge of water. The inlet section 16 contains a one-way valve 30 to prevent water or product being pushed back into the machine during a kneading phase of its operation. A sponge filter 32 is located inside the main compartment close to the outlet section. The structure, material, size and shape of the filter is dependent on the product to be processed, but typically it is a highly porous, sponge-like material. A filter with a volume of typically 10-20 ml and composed of highly porous, open-pored polyurethane foam has been found to be effective. PE nets may also be used.

The inlet and outlet sections 16, 20 are narrower than the main compartment. A further sealed compartment 34 is created downstream of the filter to house additional ingredients. These are ingredients which are difficult to dissolve or which are insoluble and which may clog the exit filter 32 of the main ingredient compartment or for other reasons should not be subjected to kneading. This may include ingredients for:

Providing mouth feel (pulp, seeds, gums, fruit pieces etc.)
Ingredient to provide fizz, where gas production during kneading would be undesirable.

Typical dimensions of the cartridge are: Main compartment 120 mm×70 mm×20 mm (with gussets extended) for a 300 ml serving size. The overall length including inlet and outlet sections is 180 mm.

The corners of the main compartment are rounded, as are the shoulders where the inlet and outlet sections merge with the main compartment. This prevents ingredients lodging in these places.

The inlet and outlet sections 16, 20 provide airtight seals 36 for the cartridge during storage. The seals are designed to prevent ingress of moisture, air etc. and egress of ingredients during storage and handling. When the inlet section is coupled to the machine, this seal at the inlet is punctured during the cartridge loading process. The outlet seal is preferably designed such that it opens during the kneading process without the need for a special mechanism. For example it may be a dissolvable seal, or a seal that can be broken open by pressure during the kneading process.

Figure 3:
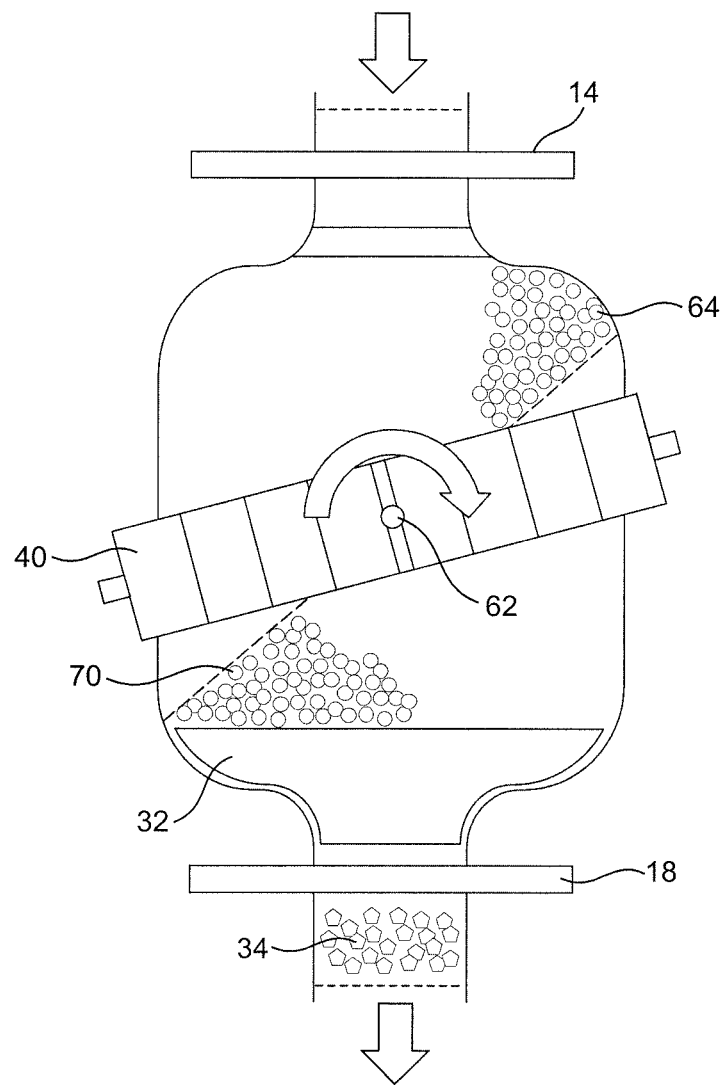
FIG. 3 is a front plan view of a second embodiment which uses a rotary motion.
Figure 8:
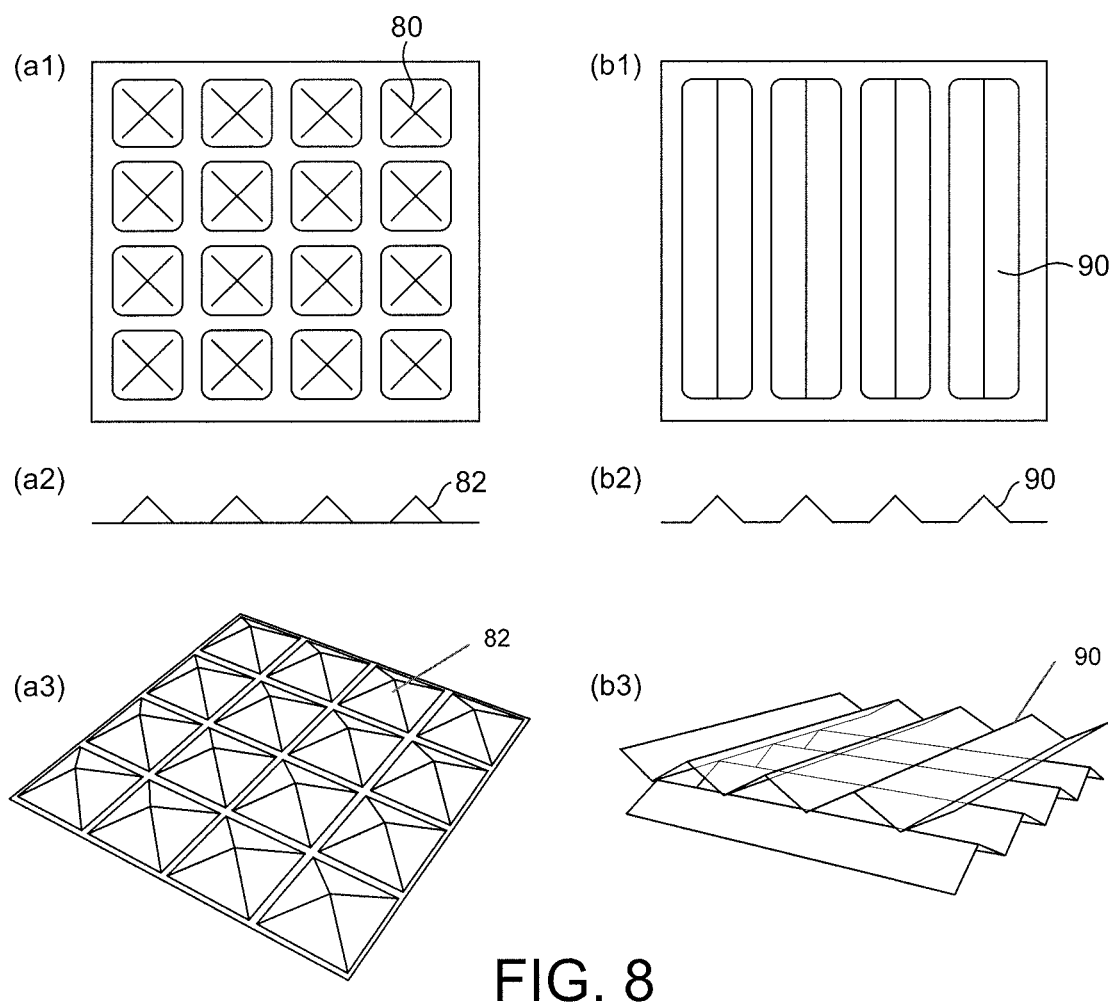
FIG. 8 shows plan, side and perspective views of two designs for a major surface of a cartridge.

As shown in FIG. 8 the major surfaces of the cartridge may be provided with formations such as a ridged, pimpled, dimpled or corrugated surface at least on its internal face. The main external surface of the cartridge as shown in FIG. 8a has an array of pyramid shaped dimples 80 which become pyramidal projections facing an interior of the cartridge. A perspective view of this internal surface is shown in FIG. 8a3. The alternative design in FIG. 8b shows a simple creased corrugation 90. In this design the corrugation in the top and bottom major surfaces of the cartridge are oriented at 90 degrees to each other. These surface features are there to help breaking up ingredient and introduce water behind ingredient blocks. Obviously many more configurations of surface corrugations, irregularities and dimpling are possible and may have different advantage for different ingredient types. In particular the grid size may be adapted to create the best results for the texture and granularity of the ingredient. The cartridge material is such that these configurations may be deformed under instantaneous pressure and snap or pop back into place when the pressure is removed.

Internal perforated walls 64 may be provided to divide up the interior of the cartridge as described in more detail below.

Couplings

The inlet coupling 14 is used to clamp the inlet section of the cartridge in place and may provide the mechanism for puncturing the seal. This coupling has several additional functions. It holds a cartridge in place, it also allows water to enter the cartridge during an initial filling phase of the beverage preparation operation, as well as resealing the cartridge during the kneading phase of the operation in order to prevent product from being pushed back into the machine. This function of the inlet coupling may be in addition to or replace the one-way valve 30, which is preferably provided inside the cartridge. The coupling can be implemented as a bar that is pressed by motorised mechanism across the cartridge inlet. It will be appreciated that other design approaches may be adopted that allow these functions to be performed.

The outlet coupling 18 is similar to the inlet coupling 14 in this embodiment, and provides a bar, which is latched over the outlet section of the cartridge. The bar can be motorised to provide sealing pressure on the outlet section to close it off during the kneading phase of the beverage preparation operation. When the kneading phase is complete, the motor can be controlled to release sealing pressure and allow the product to exit the cartridge through the outlet section 20 into a container.

Kneading Systems

The system is designed to provide rehydration of the freeze-dried ingredients within the cartridge, without having machine components contact the contents of the cartridge. The rehydration of freeze-dried fruit or vegetable ingredients and/or freeze-dried fruit or vegetable juice presents several technical problems, especially when producing cold beverages. Many fruit or vegetable based solid ingredients tend to cake, impeding effective rehydration or leading to inhomogeneous product, or they may leave sticky residue, clogging filters or the product outlet. The vigorous kneading of a soft cartridge has been found to resolve these technical problems effectively. The objective of the kneading system is to create vigorous internal agitation to move the dry ingredients around inside the cartridge and bring them into close contact with a charge of water in order to mix and homogenise the contents of the cartridge, while maintaining a low hydrostatic pressure.

Figure 2:
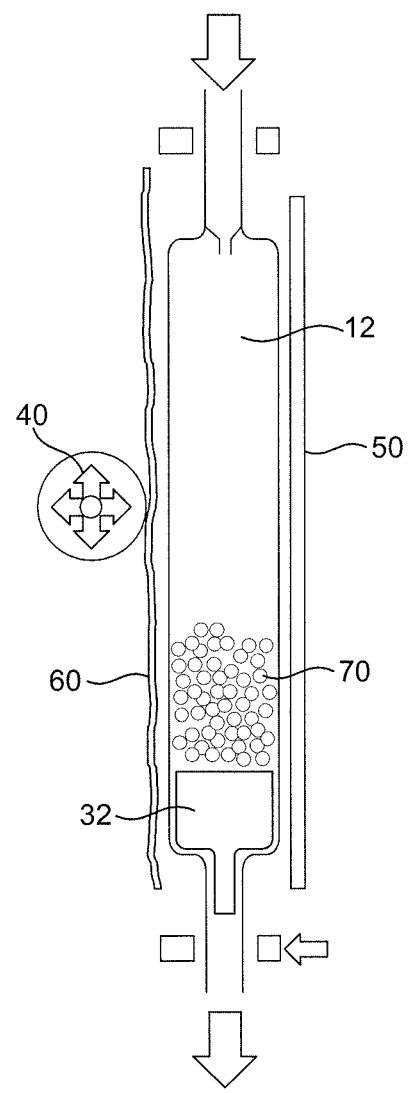
FIG. 2 is a side view of the machine of FIG. 1.

In the embodiments of FIGS. 1 to 3, the kneading system comprises a roller 40 which operates on a major surface of the exterior of the cartridge. The cartridge is supported against a fixed stage 50 and a flexible curtain 60 may be interposed between the roller and the cartridge itself. The roller 40 can be mounted on a motorised sledge that is moved under pressure along the longitudinal axis of the cartridge. The roller is mounted using a spring-loaded mechanism that maintains roller pressure on the cartridge in the direction perpendicular to the cartridge surface. This pressure can be varied during operation of the kneading system and the roller can also be lifted clear from the cartridge surface, by operation of a separate motorised drive mechanism to facilitate loading of the cartridge. The rollers are preferably segmented rubber rollers so that each segment 44 can roll freely independently of the other segments. The rollers may have a smooth, ridged, knobbly or other textured surface. The sledge is preferably driven so that it can complete one full up and down movement across the surface of the main section of the cartridge approximately once every one to two seconds.

FIG. 2 shows an arrangement in which the cartridge is mounted with a rubber separation membrane or curtain 60 interposed between the roller 40 and the wall of the cartridge. The curtain 60 is made of flexible rubber sheeting. During operation of the machine there is a risk that a cartridge may burst or leak and this will cause contamination of the kneading system. Since the kneading system is difficult to clean, the use of the curtain 60 improves hygiene and protects the mechanism.

If the kneading mechanism, rollers and rubber sheet are located in the back of the machine, the counter plate needs to be located between the user and the cartridge, and can for example take the form of a door for the receptacle 50.

The effect of the motion of the sledge up and down over the main compartment is to periodically and sequentially compress and release regions of the main compartment between the rollers causing the contents of the cartridge to be forced to move around. In the compressed region, the ingredients are brought into intimate contact with water to aid dissolution. Ridges or other formations on an internal surface of the main compartment walls as described above in relation to FIG. 8 also improve mixing.

The filter 32 is designed and positioned preferably such that the kneading roller 40 passes over it, aiding the periodic unclogging of the filter, as well as the intimate mixing of water and ingredients.

It will be appreciated that the design engineer has many options for implementing this mechanism. Some of these are illustrated in the other embodiments. In all of them, the purpose is to ensure that the cartridge is manipulated in such a manner as to bring the water and solid contents into intimate contact with one another under varying pressure conditions so as to encourage full rehydration and/or dissolution of the various ingredients in a short time.

The kneading process is preferably carried out with multiple cycles of adding water, kneading and dispensing to allow a modestly sized cartridge to dispense an acceptable beverage volume.

An arrangement of kneading rollers 40 on both sides of the ingredient cartridge would also be desirable to facilitate the mixing of water and ingredients and would reduce the likelihood of ingredients sticking to the cartridge walls. Acting on both sides of the cartridge requires a more complex mechanism and requires careful design to provide user access for loading and unloading of the cartridge.

In the Figures, the stage 50 is shown as having a flat surface; however a ridged or corrugated surface can be provided as this will facilitate the kneading action and prevent ingredients sticking to an adjacent side of the cartridge wall.

Alternative Kneading Systems

FIG. 3 shows a system in which the roller is mounted centrally at the rear of the receptacle so that it can rotate or oscillate about an axial mounting 62 perpendicular to the main surface of the cartridge. For this design it is preferable that a central compartment of the cartridge be nearly square or circular rather than rectangular so that the rotating roller covers the entire surface of the cartridge including the filter 32 during its motion. Alternatively, several rollers could be provided to act on different regions of the cartridge.

The kneading roller 40 pivots continuously around the centre of the cartridge's main compartment. To facilitate this movement the roller is segmented, and each segment 44 can rotate around the axis of the roller independently to allow a central segment to rotate slower than the outer ones.

In this embodiment the cartridge is modified by the presence of one or more perforated flexible walls 64 dividing the main ingredient compartment into individual chambers. Without such walls, depending on the consistency of the product, the roller may simply move the product in a circular motion without achieving proper mixing. With the walls present, the roller forces the product through the holes in the dividing walls, preventing the formation of large ingredient clusters and significantly improving mixing efficiency. Instead of perforated sheet walls, nets or fabrics in one or more layers may be used.

Figure 4:
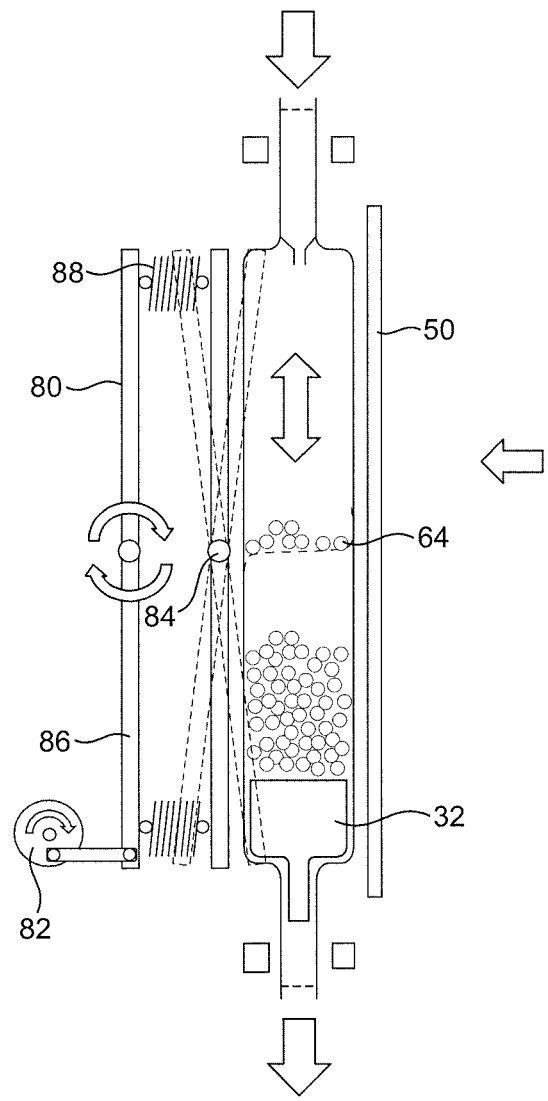
FIG. 4 is a side view of a third embodiment which uses a paddle mixer.

A further variation of the kneading system is shown in FIG. 4, which is also shown being used with a cartridge having a flexible, perforated internal wall 64. In this embodiment, the rear of the cartridge-containing receptacle contains a lever 80, which is connected to an eccentric motor drive mechanism 82. The lever supports a pivot point 84 for a kneading paddle 86. Respective ends of the lever support corresponding ends of the paddle 86 with an intervening spring-loaded system 88. This spring system provides flexibility especially during the early stages of mixing when part of the cartridge contents may be solid or highly viscous and would otherwise block the paddle movement. The oscillating movement of the lever is translated into a rocking or seesaw movement of the paddle to alternately compress and release opposite ends of the main compartment causing the contents to be pushed vigorously up and down within the cartridge. For the cartridge dimensions shown in FIG. 1, the paddles would move at a frequency of about 1 cps to 10 cps to provide effective mixing. The other side of the cartridge is supported by a stage 50 as in the previous embodiments. This may be a door of the receptacle.

The rapidity of fluid movement achievable with this kneading system is considerable and the staccato movement helps create the required vigorous agitation. Ideally irregular driving motion is preferable as this can generate a more chaotic vigorous agitation within the cartridge, without increasing the internal hydrostatic pressure.

It would also be possible to design a system where paddles operated on both sides of the cartridge. Although an up and down kneading movement has been illustrated, it will be appreciated that side-to-side kneading could also be arranged.

A curtain (not shown) may be interposed between the paddle and the cartridge in order to allow the drive mechanism to remain isolated from any leakage from the cartridge and facilitate cleaning of the receptacle. Other parts of the machine are as described in the previous embodiments.

Figure 5:
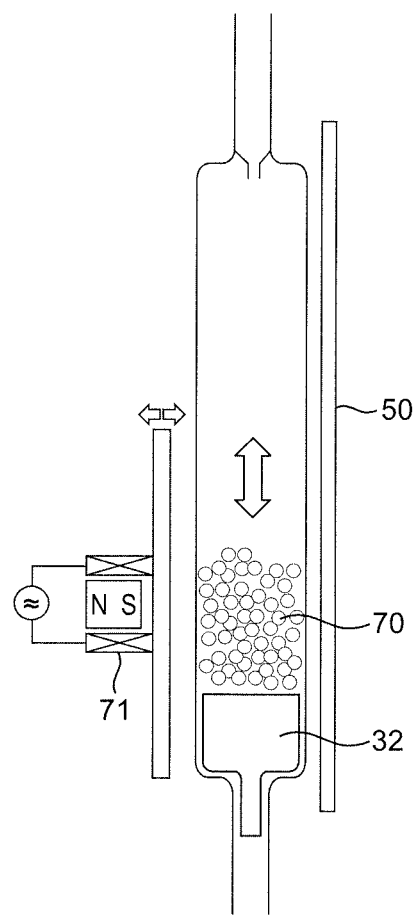
FIG. 5 is a side view of a fourth embodiment which uses an electromagnetically driven mixer.
Figure 6:
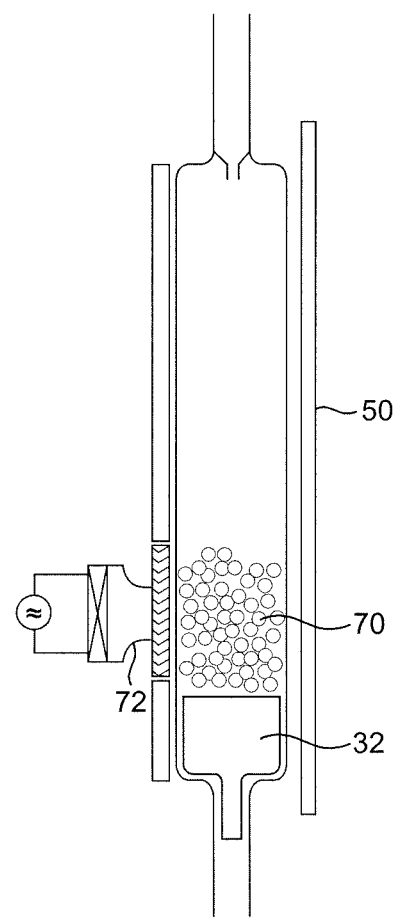
FIG. 6 is a side view of a fifth embodiment which uses ultrasonic agitation.

The kneading systems of FIGS. 5 and 6 use transducers which act from the exterior of the cartridge in order to generate vigorous agitation within it. FIG. 5 shows an electromagnetic transducer 71 and FIG. 6 uses an ultrasonic transducer 72. The objective of these is to move the liquid around really fast and break up the ingredient. These systems induce internal vibration and agitation by external action. The objective in this case is not to move the entire product charge along the cartridge but to create smaller scale agitation or stirring of the water that is in contact with undissolved ingredients. An agitator drive using a drive coil similar to that used in many loudspeakers to provide the agitation could be considered as shown in FIG. 5.

Ultrasound could also be employed as shown in FIG. 6. The use of ultrasound for mixing, emulsifying and hydrating liquids and solids is a well-known industrial process. An ultrasound source such as a piezo-electric source 72 with impedance matching horn could be employed. It will be necessary to provide acoustic contact between the impedance matching horn and the product in the cartridge. This could be provided by a pad of soft incompressible gel or silicone pads, which make contact with the external surface of the cartridge. Alternatively, water diverted from the water inlet could be employed to provide the acoustic contact. It will be appreciated that aspects of each embodiment described may be combined in different ways.

Figure 7:
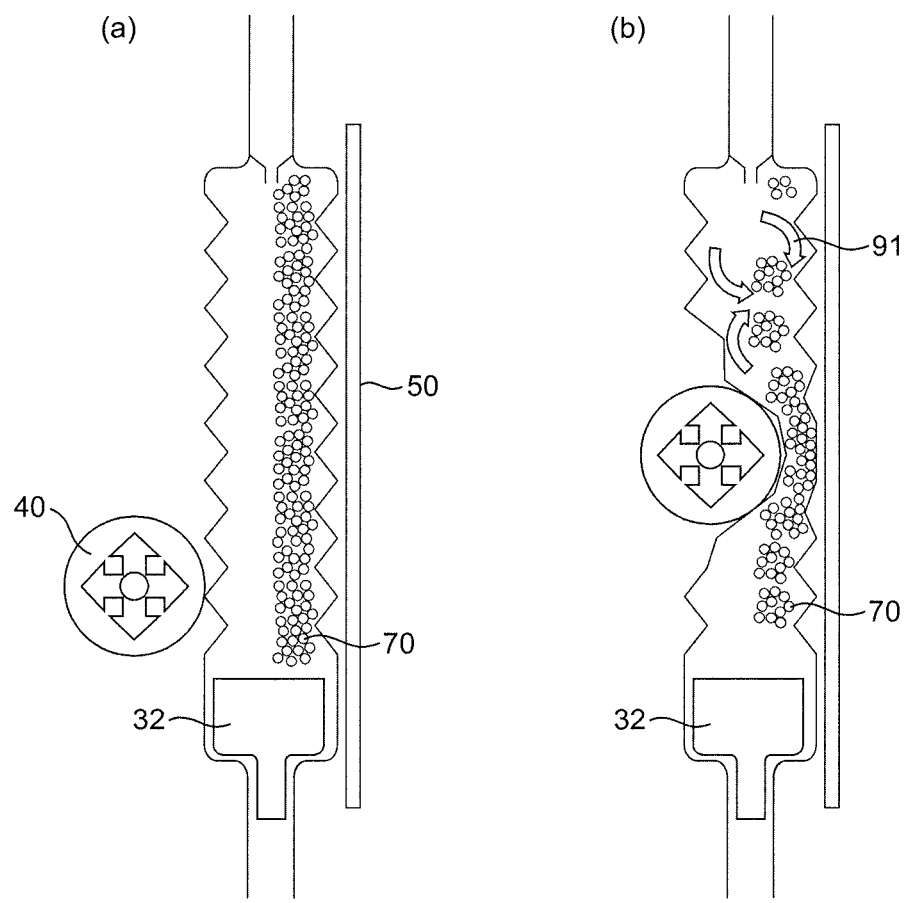
FIG. 7 is a side view of a sixth embodiment similar to the first embodiment but illustrating the effect of using a corrugated cartridge.

FIG. 7 shows a side view of the corrugated cartridge with the roller 40 dis-engaged and engaged. The ingredients 70 get squeezed against the cartridge wall when the roller passes and may stick, forming a hard to dissolve mass. The corrugation may help in two ways: while the roller passes, the corrugation may help to break up ingredients into smaller masses; and once the roller has passed, the corrugation springs back into shape, lifting the ingredients from the wall of the cartridge, breaking them up into smaller fragment and allowing water to pass behind the ingredient masses as indicated by arrows 91 and ingredient blobs in FIG. 7(b).

Cartridge Contents

The ingredients 70 for the beverage are contained in the cartridge 12, preferably in powder or granule form. The solid ingredients can consist of a combination of:

Freeze- or spray-dried fruit or vegetable juice
Freeze-dried whole-fruit or vegetable (for smoothies, purees etc.)
Sugar or sugar/acid beverage base
Fruit or vegetable pulp, starch, nuts, grains or seeds or similar to provide mouth feel
Minor ingredients such as sweeteners, fibres, flavours, spices, preservatives, colouring, fizz generating chemicals, colour etc.
Desiccated ingredients and nutrients such as vitamins, proteins, minerals and the like from synthetic or natural sources (e.g. soya, spirulina etc.)
Burstable or soluble capsules for liquid minor ingredients (such as liquid flavors, sweeteners)
Desiccants and other process aides that do not end up in the final beverage Although mainly intended for use with solid ingredients in powder or granule format, cartridges may contain liquid ingredients like juice or beverage concentrates, plant components (such as teas), meat or animal products (soup, sauces).

The total ingredient volume is such that typically >50% or more of the extended volume of the cartridge is left empty for the addition of a water charge and to provide volume for the kneading process.

In this embodiment cartridges contain typically 50 g of fruit and juice solids in a cartridge of 150-170 ml net volume when its gusseted side panels are fully extended. The cartridge volume is typically 50 ml unexpanded for a 300 ml single serve smoothie or juice. This is driven by the fact that typical juice/smoothies contain about 50 g solid matter, mainly sugars, per serving, that need to be in the pouch. The expanded volume is given by the fact that you need at least twice that amount of water for this not to turn to cement (e.g. you are making a double strength smoothie in the first pass, i.e. needing 2 to 3 charges of water). With some freeze-dried juice-only ingredients a bit less is possible (say 100 ml). If you use sweeteners (e.g. less sugar) smaller packages are possible. The additional ingredient compartment at the outlet for fibre and such contains perhaps 1-10 g of solid ingredients.

The freeze-dried ingredients are vacuum packed in the cartridge to provide an extended ambient shelf life of several years.

Especially in the early stages of the rehydration process freeze-dried juice or vegetable ingredients have a strong tendency to stick to the wall of the cartridge during kneading and so impede the further rehydration process. This is particularly an issue where the kneading mechanism acts only on one side of the cartridge and against a rigid stage, as for example shown in FIG. 2. Making the stage from flexible or soft materials helps with some types of ingredients. Providing one or both of the main cartridge walls with corrugations, dimples or other such protrusions has been found effective to mitigate this problem. This is illustrated in FIGS. 7 and 8. Preferably these protrusions are designed such that they are compressed by the kneading mechanism and resume their original shape when the kneading pressure subsides. This separates stuck ingredients from the wall, and can help to break up larger ingredient conglomerates.

Although a cartridge with one main compartment has been disclosed, if more complex products are required, the main compartment could be divided into two of more compartments, either side-by-side or overlaying each other. The subsidiary compartment could then contain a tuning ingredient like pulp that could be added according to taste. Each compartment would require a separate water inlet, and water flow would be controlled by the controller in order to change the mixing ratio of ingredients.

In order to maximise the product range available from a machine using this method, cartridges can also be supplied which contain ingredients such as tea which would not ordinarily require such processing. In such cases, the machine can be programmed not to apply the external action to the cartridge.

Operation of the Machine

An operating cycle of the machine includes a cartridge installation phase, a water inlet phase in which a charge of water is fed into the cartridge, a kneading phase to rehydrate and mix the product with water, and a dispensing phase. The last three phases may be repeated several times.

In the installation phase the cartridge with the necessary ingredients for the chosen beverage is placed by the user in the receptacle. The cartridge is engaged with the couplings 14 and 18 that hold its inlet and outlet sections. The user can then use the control panel to select an appropriate time and or mode of operation for the machine or instructions can be automatically read by the machine from the cartridge. The required time and/or programme can be indicated on the cartridge depending on the ingredients. In some cases longer or shorter operation times may be required. For other beverages the machine may be programmed to charge the cartridge with water in stages. Once the door of the receptacle is closed the operating cycle can commence with the piercing of the inlet seal and charging with water from the water supply. With water in the cartridge and non-return valve 30 with the assistance of the inlet coupling holding the inlet section sealed, the kneading phase can begin. There may be multiple kneading phases and additional water charges if prescribed by the programme. Once at least a first kneading phase is complete, the outlet valve is operated to break the outlet seal (if it has not been opened by pressure during the kneading phase) and allow the beverage to be dispensed via the compartment 34 into a container. The additional ingredients in compartment 34 are added to the beverage in this dispensing phase.

Once the cycle is complete the used cartridge can be removed from the receptacle and discarded. Since the beverage has not passed through any part of the machine itself the cleaning requirement is minimal.

The objective of all agitation mechanisms and cartridge features described here is to facilitate the rapid movement of water and ingredients with respect to each other in order to constantly break up ingredient conglomerates, bringing water into contact with fresh surfaces of the ingredient body and detaching ingredients that become stuck to the surface of the cartridge by the action of the kneading or vibrating mechanisms. This is necessary, since on contact with water the freeze dried ingredients of interest here tend to form a solid body with a relatively water impermeable surface, impeding further dissolution of ingredients. This process of caking of freeze dried ingredients occurs because of the hygroscopic nature of the ingredients, which allows the thin surface layer of a mass of material to both absorb large amounts of water while simultaneously inducing a material property change. In contrast, the brewing mechanisms as for example described by COLSON, focus on passing water through a compacted and essentially static body of non-hygroscopic ingredients. The emphasis in the case of the COLSON device is on providing counter-pressure to the hydrostatic pressure of the brewing water.

In contrast the mechanism described here is designed to create turbulence and shear forces in the liquid by forcing water repeatedly through small gaps in the ingredients, and in some cases to create water movement sufficiently rapid that inertial forces in the fluid become significant, helping to break up ingredients. Other than through kneading this can be achieved by introducing strong and rapid vibration to the content of the cartridge, at a frequency where inertial forces are significant for the typical volumes considered here, such a frequency of >10 cycles per second.

The manipulation time of 20 s to 1 min is what is acceptable for on-demand serving and that time is achievable with vigorous kneading.

Pressure: Hydrostatic pressure is very low (so that the cartridge does not burst). The pressure applied by the kneading mechanism is typically less than 10 kiloPascal.

Speed: The kneading mechanism would move about 1 per second up or down, perhaps twice that much. The rotary mechanism can be faster and that is one of its attractions. It would go at perhaps 1-5 revolutions per second. The electromagnet vibrating mechanism would typically be driven straight off the mains so 50 or 100 Hz is a reasonable operating frequency.

The invention claimed is:

1. A method of producing a beverage, the method comprising:
    breaking a seal of a sealed flexible, expandable cartridge having an exterior and an interior, wherein the cartridge comprises loose, dry freeze-dried fruit and/or vegetable ingredients in its interior;
    introducing a charge of chilled water into the interior of the cartridge; and acting with a kneading mechanism on or from the exterior of the cartridge to apply shear force to the freeze-dried fruit and/or vegetable ingredients, the cartridge being expandable so that the freeze-dried fruit and/or vegetable ingredients are able to be agitated vigorously in the interior of the cartridge and to contact the freeze-dried fruit and/or vegetable ingredients with the water under low hydrostatic pressure applied by the kneading mechanism, which is less than 10 kiloPascal, to produce a beverage reconstituted from the freeze dried fruit and/or vegetable ingredients.

2. The method of claim 1, wherein the charge of water is equal to or greater than the volume of the dry freeze-dried fruit and/or vegetable ingredients.

3. The method of claim 1, further comprising dispensing the beverage from an outlet of the sealed flexible cartridge after a predetermined time.

4. The method of claim 1, wherein the kneading mechanism comprises at least one roller that moves over a surface of the sealed flexible cartridge in order to compress and release regions of the sealed flexible cartridge, the kneading mechanism configured to act mechanically on the exterior of the sealed flexible cartridge to move the freeze-dried fruit and/or vegetable ingredients contained in the sealed flexible cartridge and bring the freeze-dried fruit and/or vegetable ingredients into contact with the chilled water under the low hydrostatic pressure.

5. The method of claim 4, wherein the at least one roller has independently moveable segments.

6. The method of claim 1, wherein the kneading mechanism comprises a pivotally mounted paddle and a driving mechanism for rocking the paddle against a main compartment of the sealed flexible cartridge, the kneading mechanism configured to act mechanically on the exterior of the sealed flexible cartridge to move the freeze-dried fruit and/or vegetable ingredients inside the sealed flexible cartridge and bring the ingredients into contact with the chilled water under the low hydrostatic pressure.

7. The method of claim 1, wherein the kneading mechanism comprises an electromagnetic transducer configured to drive a paddle to act mechanically on the exterior of the sealed flexible cartridge to move the freeze-dried fruit and/or vegetable ingredients contained in the sealed flexible cartridge and bring the freeze-dried fruit and/or vegetable ingredients into contact with the chilled water under the low hydrostatic pressure.

8. The method of claim 1, wherein the kneading mechanism comprises an ultrasound source acting from the exterior of the sealed flexible cartridge to move the freeze-dried fruit and/or vegetable ingredients inside the sealed flexible cartridge and bring the freeze-dried fruit and/or vegetable ingredients into contact with the chilled water under the low hydrostatic pressure.

9. The method of claim 1, wherein the beverage is produced in 30-60 seconds.

* * * * *